United States Patent [19]

Fell et al.

[11] Patent Number: 4,541,557
[45] Date of Patent: Sep. 17, 1985

[54] MAGNETIC TAPE GUIDE ROLLER SYSTEM

[75] Inventors: Wolfgang Fell, Seeheim; Heinrich Zahn, Rossdorf; Peter Gunschmann, Darmstadt; Winfried Büchel, Büttelborn, all of Fed. Rep. of Germany

[73] Assignee: Robert Bosch GmbH, Stuttgart, Fed. Rep. of Germany

[21] Appl. No.: 492,428

[22] Filed: May 6, 1983

[30] Foreign Application Priority Data

May 12, 1982 [DE] Fed. Rep. of Germany ....... 3217762

[51] Int. Cl.⁴ .............................................. B65H 27/00
[52] U.S. Cl. .................................... 226/191; 226/194; 242/76
[58] Field of Search ............... 226/190, 194, 196, 191, 226/192; 308/184 A, 184 R, 194; 242/76

[56] References Cited

U.S. PATENT DOCUMENTS

| | | | |
|---|---|---|---|
| 2,622,448 | 12/1952 | Lorig | 226/196 X |
| 2,683,026 | 7/1954 | Preszler | 308/194 X |
| 2,704,695 | 3/1955 | Ricefield | 308/194 |
| 3,029,657 | 4/1962 | Roper | 226/194 X |
| 3,294,334 | 11/1966 | Boag | 242/194 |
| 3,507,437 | 4/1970 | Lips | 226/196 |
| 3,510,185 | 5/1970 | McKee | 308/194 |

FOREIGN PATENT DOCUMENTS

| | | | |
|---|---|---|---|
| 883577 | 7/1953 | Fed. Rep. of Germany . | |
| 1038477 | 8/1955 | Fed. Rep. of Germany . | |
| 1004039 | 3/1957 | Fed. Rep. of Germany | 226/194 |
| 1241141 | 11/1963 | Fed. Rep. of Germany . | |
| 1282701 | 12/1965 | Fed. Rep. of Germany . | |
| 2131731 | 6/1971 | Fed. Rep. of Germany . | |
| 425391 | 5/1967 | Switzerland | 226/190 |
| 1011999 | 12/1965 | United Kingdom | 226/190 |

*Primary Examiner*—Harvey C. Hornsby
*Assistant Examiner*—Scott J. Haugland
*Attorney, Agent, or Firm*—Frishauf, Holtz, Goodman & Woodward

[57] ABSTRACT

To guide magnetic tape, particularly tape used in video tape recording, and especially for digital video signals for self-centering of the tape with respect to a datum (41) of a roller system, two coaxially journalled frusto-conical rollers are provided, which are independently rotatable with respect to a shaft (4) having a shaft axis (40) and, further, tiltable about tilt axes (13, 14) which extend at right angles to the shaft axis (40) and intersect the intersection point of the then existing axes of rotation (7, 8) of the respective rollers with the shaft. Upon drift or creep of the tape (1) from symmetrical positioning with respect to the rollers, return forces will be applied to the tape tending to return the tape to centered, symmetrical position, independently of the running direction of the tape.

13 Claims, 2 Drawing Figures

MAGNETIC TAPE GUIDE ROLLER SYSTEM

REFERENCE TO RELATED LITERATURE

German published patent applications DE-AS No. 12 41 141; DE-AS No. 21 31 734; DE-AS No. 10 38 477; DE-AS No. 12 82 701; German Patent DE-PS No. 883 577; and U.S. Pat. No. 3,294,334.

The present invention relates to a guiding arrangement for magnetic tape, and more particulary to a guiding system to guide magnetic tape which is adapted to carry video signals, and particularly representation, in magnetic digital recording form, of digital video signals, in which the tape is retained in cassettes.

BACKGROUND

Various types of guiding arrangements for tapes retained in cassettes in which the tape is spooled from a reel positioned in a first plane on a reel positioned in a second plane parallel thereto, for example in an arrangement in which a pay-out reel and a take-up reel in a cassette are located above each other. Such cassettes are described, for example, in German published patent application DE-AS No. 12 41 141. To guide the tape from one plane to another, a plurality of fixed guide pins are provided, the guide pins having bowed or curved guide surfaces and flanges at both sides of the guide surfaces in order to guide the tape from a reel in a first plane to a reel in a plane parallel thereto, for example above or below the first reel.

German published patent application DE-AS No. 21 31 731 describes a tape cassette having coaxially arranged reels, in which the cassette has a guide track, and an opening therein which is diagonal/parallel to a narrow side of the cassette. A semi-cylindrical fixed guide track is provided which has a pair of flanges in order to guide the magnetic tape from the plane of one reel to the plane of the other reel, for example immediately above or below the first reel.

Cassettes of this type have the disadvantage that the frequent deflection of the tape leads to increased friction of the tape on the guide elements, which causes flutter or wow in reeling of the tape, in other words, which interferes with uniform, smooth movement of the tape at a fixed predetermined speed. The edges of the magnetic tapes are very thin, and if the guide elements are not precisely aligned, and carefully and accurately polished, damage to the fragile edges of the tapes may result. This is particularly annoying in tape cassettes in which the magnetic tape is so used that its operating direction can change. If the tape is to operate in either a first or a reverse direction, the accuracy of guidance must be high, and damage to the edges of the tape must be avoided.

In order to decrease friction of the tape on a guide surface, it has been proposed to utilize rolling elements. One such cassette is described, for example, in U.S. Pat. No. 3,294,334. A magnetic tape is guided from a reel in one plane to a reel in another plane. The path of the tape includes a guide track which also has the respective scanning elements thereon. By suitable choice of the run-on and run-off in which the tape runs, it is possible to so guide the tape that it operates approximately centrally on guide elements which are formed with flanges. Due to tolerances within the magnetic tape, particularly upon reverse spooling, it is possible that the tape position changes, and differs from the tape position when the tape was running in a forward direction, for example by engaging opposite flanges on a flanged roller in dependence on the direction of movement of the tape. When using high-density recording, the magnetic tape can thus shift laterally, which may lead to loss of reproduction of previously recorded tracks.

German Pat. No. 883,557 describes the use of conically constructed partial drum elements which are used to center thin tapes, and which thereby are intended to avoid fixed or rotating lateral guide structures, thus eliminating damage to the edges of the tape while centering the tape on the drum. The thicker ends of the conical partial drum elements face each other. The drum elements are journalled elastically on a continuous shaft, roughly at the center of gravity of any one of the elements, so that the circumferential surface may adjust itself automatically under tension of the tape to an approximately cylindrical guide path. Due to the resulting return forces, the tape tends to run in the middle of the overall arrangement, regardless of the direction of rotation. Both tape portions are driven in synchronism.

Application of a centering or otherwise directional force by the tape itself can be obtained by separating a roller used to deflect the tape in V-shape—see German published patent application DE-AS No. 10 38 477—and to offset the respectively facing ends of the rollers outwardly in that direction which is in the same plane as the resulting tension force for the tape. This applies a directional force on the tape which counteracts a tendency of lateral creep of the tape from a central position.

Guidance of elongated tapes, typically recording carriers adapted for magnetic transducer apparatus, can also be carried out by using frusto-conical rollers which are located on respectively mutually inclined shafts, and to locate the ends of the frusto-conical roller elements which are smaller adjacent each other—see German published patent application DE-AS No. 12 82 701.

THE INVENTION

It is an object to provide a tape guiding system in which a tape can be guided with respect to a datum—for example a fixed center position on a shaft—in such manner that the edges of the tape will not be damaged, and which is simple and versatile in use, while permitting bi-directional movement of the tape.

Briefly, the guide elements are frusto-conical rollers which are located in self-adjusting floating bearings. The rollers are spaced from each other by such a spacing that they can tilt or tip independently of each other under influence of the tape, which is guided thereover, over one or more axes which intersect the common shaft axis and the then occurring instantaneous axis of rotation of the respective roller element.

The tilt axis about which the frusto-conical elements can deflect extends, for example, at right angles to the shaft of the system. Inclination of the axis of rotation of the respective element about this tilt axis thus permits self-adjustment of the outer circumference of the respective roller element to apply a centering force on the tape, and, in one form of operation, presents to the tape an essentially cylindrical circumference portion.

The system of the present invention has the advantage that the frusto-conical elements will provide the desired centering effect regardless of the direction of operation of the tape, and, additionally, will adjust themselves rapidly to changes in operating direction.

Further, the intensity of the resetting or centering force is dependent on the deflection of the magnetic tape from the datum, for example centered position. The system has the additional advantage of resulting in particularly quiet and stable running of the magnetic tape.

DRAWINGS

FIG. 1 is a schematic vertical sectional view through the system while the tape is stationary and not applied with force against the rollers; and FIG. 2 illustrates the same arrangement when running with a moving tape thereover, in which the tape moves in the direction of the arrow V.

DETAILED DESCRIPTION

Figure 1:
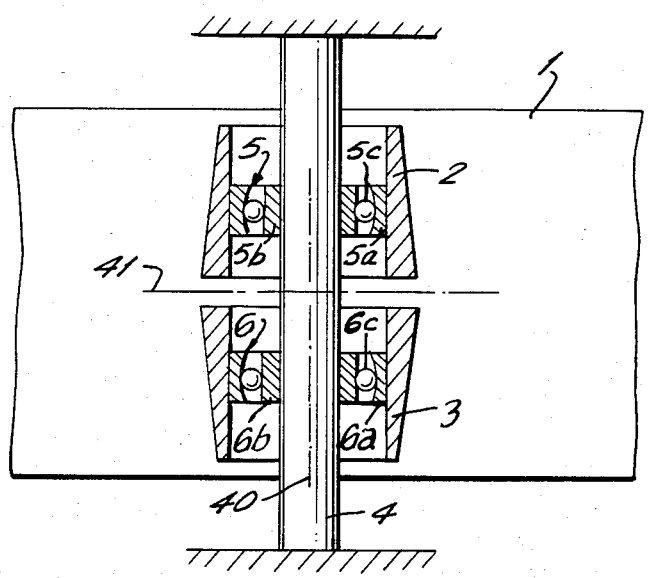

FIG. 1 shows a magnetic tape 1 which can be supported by two frusto-conical rollers 2, 3 which are positioned for rotation on a common shaft 4, forming a system axis or shaft. They are located on the shaft with respect to a datum position, for example centrally between supports—shown only schematically—with the datum being the precise center between the two rollers 2, 3, which are identical and located with the wider portions facing each other, mirror-symmetrical with respect to the central datum.

Each one of the rollers 2, 3 has a bearing 5, 6 located approximately centrally of the length of the individual rollers 2, 3. The bearings 5, 6 are so constructed that they permit lateral deflection of the outer races 5a, 6a with respect to the inner races 5b, 6b thereof. The bearings are ball bearings. For example, the ball bearings 5, 6 can be constructed as floating or tilting ball bearings or barrel ball bearings having one of the races formed with a spherical running surface. As illustrated, the outer races 5a, 6a are formed with a spherical running surface, and the inner races 5b, 6b are formed with a groove for retaining the balls 5c, 6c in position. Of course, the arrangement may be reversed, the spherical surface can be formed on the inner races, and no groove need be used, the balls being retained in a cage which is maintained in position in suitable and well known manner. The position of the balls 5c, 6c, and hence of the outer surfaces of the rollers 2, 3, in space, is indeterminate and random if the tape 1 is stopped or, for example, removed from the system.

Figure 2:
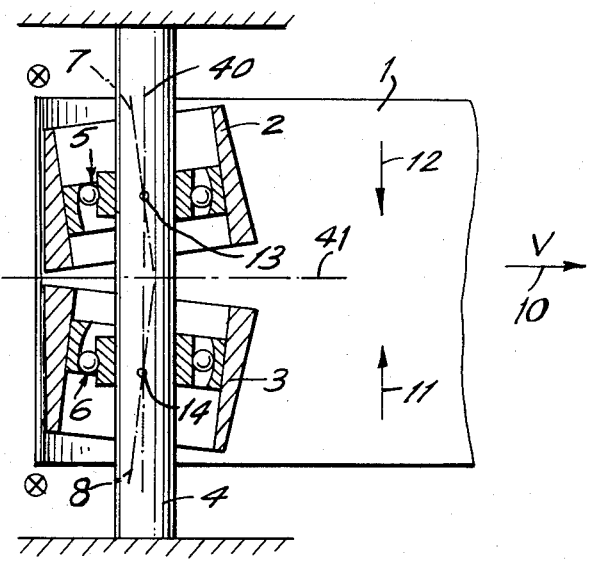

Operation, with reference to FIG. 2: let it be assumed that tape 1 moves in the direction V of arrow 10, resulting in tilting of the frusto-conical rollers 2, 3. The instantaneous axes of rotation 7, 8 of the rollers 2, 3 then will depart from congruence of the system axis 4. The tilt axes 13, 14 are at right angles to the plane formed by the axes 7, 8 and 4. The tilt angles 13, 14 are located at the point of intersection of the respective axis of rotation 7, 8 with the system or shaft axis 40 of the shaft 4. The tilt axes in the embodiment of FIG. 2 extend perpendicularly to the plane of the drawing of FIG. 2.

Upon deviation of the tape 1 from the axis of symmetry 41, the two guide rollers 2, 3 will be loaded non-uniformly, and the resulting force will tend to rapidly shift the tape 1 back to centered position, in which it has retained its position with respect to the datum, which is the intersection of the axis of symmetry 41 with the axis 40 of the system. If the tape 1 shifts downwardly, a resulting force in the direction of the arrow 11 will result, which will shift the tape again to centered position, upwardly; if the tape should tend to shift upwardly, a downwardly directed force 12 will be applied thereto to shift the tape downwardly, again to centered position.

If the direction of tape movement would change, that is, counter the direction V as indicated by arrow 10, the rollers 2, 3 would tilt to the left—with respect to FIG. 2—so that mirror-symmetrical conditions with respect to FIG. 2 would then pertain. The conditions would be the same regardless of the direction of tape movement; only the direction of the axes of rotation of the rollers 2, 3 would change.

The system permits deflection of tape about 90° and more.

The system is particularly suitable for magnetic tape guidance arrangements, particularly for video tape, and especially for video tape which carries digitally recorded signals. It is, however, not limited to this field and can be used with any type of magnetic tape recorder transport systems, whether or not it is used with magnetic tape cassettes or cartridges.

Various changes and modifications may be made within the scope of the inventive concept.

We claim:

1. In combination with magnetic tape (1),
a guide roller system for dynamically centering the tape, while running, against lateral shifting, in a precisely predetermined position with respect to a datum (41), without damaging the edges of the tape, having
a support shaft (4) having a shaft axis (40);
two frusto-conical rollers (2,3);
and bearings (5,6) for rotatably mounting the rollers on the shaft,
wherein, in accordance with the invention,
said rollers (2,3) are rotatable, independently of each other, about instantaneous axes of rotation (7, 8);
said bearings are located between the shaft and the respective rollers, and rotatably position the rollers on the shaft, with spacing from each other, mirror-symmetrically with respect to said datum, and being characterized by permitting individual deflection or tipping or tilting of the rollers, about respective tilt axes (13,14) which intersect
(1) the instantaneous axes (7,8) of rotation of the respective rollers, and
(2) the axis (40) of the shaft (4), under force applied by the magnetic tape running in either direction over the surfaces of the rollers.

2. System according to claim 1, wherein the tilt axes (13, 14) intersect the axis (40) of the shaft at a right angle.

3. System according to claim 1, wherein the rollers (2, 3) are symmetrically journalled on the bearings (5, 6), and said datum (41) is defined by a plane perpendicular to the axis (40) of the shaft (4) and located midway between said bearings (5, 6).

4. System according to claim 3, wherein the bearings comprise a first bearing race (5a, 6a);
a second bearing race (5b, 6b);
and a group of balls (5c, 6c) positioned between said races;
and wherein at least one of said bearing races has a spherical surface.

5. System according to claim 4, wherein one of the races (5b, 6b) is formed with a ring-shaped groove and the other one of the races (5a, 6a) is formed with a spherical surface, the balls running in said groove and against the spherical surface.

6. System according to claim 4, further comprising means for producing, in response to lateral deflection of said running tape with respect to said datum (41), a resulting restoring force in the direction of said datum (41), namely, outer (5a, 6a) and inner (5b, 6b) races, of each of said bearings, which are configured to laterally shift relative to each other, in response to a change in loading upon the respective roller within which each bearing is disposed.

7. System according to claim 6, wherein
during running of said tape, said rollers each have, at any given instant, a sectoral surface in contact with said tape, and
the tape-contacting surface of each of said rollers has a side adjacent said datum (41) and a side remote from said datum (41), and
said restoring force producing means comprises means for tilting the datum-adjacent side of the tape-contacting surface of the more heavily loaded roller closer to the axis (40) of said shaft (4) than the datum-remote side of the tape-contacting surface of said roller, resulting in a smaller effective diameter at said datum-adjacent side.

8. System according to claim 7, wherein
said roller tilting means comprises ball bearings (5,6) contained between coaxial inner (5b,6b) and outer (5a,6a) bearing races, attached respectively to said shaft (4) and to said roller (2,3), one of said inner and outer races having a concave surface.

9. System according to claim 1, wherein said bearings (5, 6) comprise barrel or rocking or floating bearings.

10. System according to claim 1, wherein said bearings (5, 6) comprise barrel or rocking or floating bearings.

11. System according to claim 1, wherein the frusto-conical rollers are positioned on the shaft with the larger diameters of the rollers facing each other.

12. System according to claim 1, wherein the frusto-conical rollers are positioned on the shaft with the larger diameters of the rollers facing each other.

13. System according to claim 1, wherein the tape (1) carries digitally encoded video signals.

* * * * *